Aug. 12, 1958
D. RAMADANOFF
2,847,332
METHOD FOR INTRODUCING METALLIC SILVER
IN CARBON WITH UNIFORM DISTRIBUTION
Filed Sept. 7, 1955
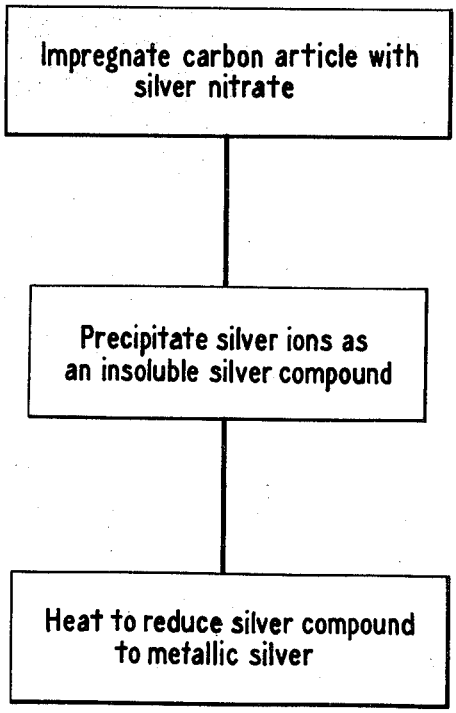
INVENTOR
DIMITER RAMADANOFF
BY *Herbert J. Evers*
ATTORNEY

United States Patent Office 2,847,332
Patented Aug. 12, 1958

2,847,332

METHOD FOR INTRODUCING METALLIC SILVER IN CARBON WITH UNIFORM DISTRIBUTION

Dimiter Ramadanoff, Berea, Ohio, assignor to Union Carbide Corporation, a corporation of New York Application September 7, 1955, Serial No. 533,021

4 Claims. (Cl. 117—228)

This invention relates to an improved carbon article containing metallic silver, and more particularly concerns an improved silver-containing carbon article, and a method of introducing metallic silver into the carbon article with uniform distribution.

Carbon articles containing relatively small amounts of metallic silver find certain industrial uses, for example, commutator brushes, electrodes, etc. It is obvious that uniformity of silver distribution in such carbon articles is highly desirable for their efficient functioning. However, the present methods of introducing the metallic silver into carbon with uniform silver distribution are not entirely satisfactory. Usually the carbon article is impregnated with a soluble silver solution such as silver nitrate, and left to be air dried. Thereafter the dried carbon article is heated to reduce the silver salt to metallic silver. However, it has been found that during air drying there is a migration of the silver salt to the outer surface of the carbon article. In effect, this produces a lower concentration of silver salt in the center of the carbon article. As a consequence, during the subsequent heat treatment more silver is reduced near the outer surfaces of the carbon than at the center, resulting in non-uniformity of silver distribution.

Therefore, it is an object of this invention to provide an improved method of producing silver-containing carbon articles, whereby metallic silver may be introduced into the carbon articles with uniform distribution.

Another object of the present invention is to provide a carbon article having an improved distribution of silver therein.

The single figure in the drawing is a flow diagram embodying the principles of the method of the present invention.

In the present invention uniformity of silver distribution in a carbon article may be achieved by impregnating the carbon article with an aqueous solution of silver nitrate, precipitating the silver ions out of the silver nitrate as an insoluble silver compound while the article is still wet to prevent migration of the silver nitrate, and then heating the carbon article to reduce the insoluble silver compound to metallic silver. The insoluble compound formed in the carbon article in accordance with the principles of the invention should have a low volatility, and should be capable on thermal decomposition of yielding reaction products which are not deleterious to the composition of the carbon article. To this end the carbon article may be impregnated by vacuum-pressure means with a solution of silver nitrate. While the article is still wet, and before migration commences, it may be exposed to ammonia fumes to precipitate the silver ions in situ as silver oxide. This is followed by reduction of the silver oxide to metallic silver by heat treatment.

A preferred treatment of the silver nitrate impregnated carbon article is to form the silver nitrate into an insoluble silver salt such as silver carbonate, while the article is still in the wet condition, and then to thermally decompose the insoluble silver salt to metallic silver. For the accomplishment of this purpose the silver ions in the nitrate-impregnated carbon article are precipitated in situ by a saturated aqueous solution of ammonium carbonate to form silver carbonate. The reduction of the insoluble salt to metallic silver may then proceed by thermal decomposition in a manner similar to the reduction of the silver oxide as described hereinabove.

In order to indicate still more fully the nature of the present invention, the following examples of typical procedures are set forth, it being understood that these examples are presented as illustrative only, and that they are not intended to limit the scope of the invention. In the examples to follow, the carbon article into which metallic silver is to be introduced is electro-graphitic brush stock in the form of a cylinder having a diameter of 1.0 inch and a length of 1.5 inches.

EXAMPLE I

A carbon cylinder is impregnated with a solution of one gram of silver nitrate in 5 cc. of water. The impregnation is carried out by vacuum-pressure means, which consists in placing the carbon cylinder in a chamber that is evacuated to about 10 mm. of mercury, introducing the impregnating solution into the pores of the carbon cylinder, and then increasing the pressure in the chamber to about 85 p. s. i. Immediately after impregnation, while still wet, the carbon cylinder is exposed to ammonia vapors by placing the cylinder for fifteen hours in a desiccator above concentrated ammonium hydroxide. Thereafter the carbon cylinder is heated in a separate chamber to 300° C., and held at this temperature for approximately two hours. Data illustrating the uniformity of silver distribution employing this treatment using as an impregnant a solution of one gram of silver nitrate in either 5 or 10 cc. of water are shown in Table I.

EXAMPLE II

A carbon cylinder is impregnated with a solution containing one gram of silver nitrate in 5 cc. of water according to the impregnation method described hereinabove in Example I. Immediately after impregnation, while still in the wet state, the carbon cylinder is placed in an aqueous saturated solution of ammonium carbonate for 15 hours. The carbon cylinder is removed and heated to a temperature of approximately 300° C. for a two hour period. Data illustrating the uniformity of silver distribution employing this treatment are shown in Table I.

EXAMPLE III

A carbon cylinder is impregnated with a solution of one gram of silver nitrate and 5 cc. of water, using vacuum pressure means previously described in Examples I and II. The carbon cylinder is then air dried for approximately 18 hours, after which it is packed in coke and heated at 650° C. for a period of approximately two hours. Data illustrating the silver distribution employing this treatment are shown in Table I which follows.

Table I.—*The effects of treatment on uniformity of silver distribution in carbon articles*

| Treatment | Solution Concentration | Percent Silver Ash Values | | |
|---|---|---|---|---|
| | | Ends | Core | Shell |
| $NH_3$ vapors | $AgNO_3$ 1 gm., $H_2O$ 5 cc | 1.75 | 1.35 | 1.35 |
| $NH_3$ vapors | $AgNO_3$ 1 gm., $H_2O$ 10 cc | 0.945 | 0.800 | 0.745 |
| $(NH_4)_2 CO_3$ solution | $AgNO_3$ 1 gm., $H_2O$ 5 cc | 0.527 | 0.752 | 0.799 |
| Air drying | $AgNO_3$ 1 gm., $H_2O$ 5 cc | 1.81 | 0.55 | 1.71 |

In the above tests the distribution of metallic silver in the carbon cylinder was determined by analysis of the ends, center core and shell. The ends were cut about ¼ inch from each end. A center core about ½ inch in diameter was then removed, leaving an outer shell about ¼ inch thick.

The above analyses clearly show the success of the subject invention. When carbon cylinders are merely air dried, the migration of the silver to the outer surfaces results in non-uniformity of the silver distribution. However, treatments according to the method of the invention show highly improved uniformity of silver distribution. It is to be understood that modifications and variations may be effected without departing from the scope of the novel concepts of the present invention.

This application is a continuation-in-part of my co-pending application Serial No. 380,139, now abandoned, filed September 14, 1953.

What is claimed is:

1. A method of introducing and uniformly distributing metallic silver into a carbon article, which method comprises impregnating the carbon article with an aqueous solution of silver nitrate, precipitating the silver ions out of said silver nitrate solution as an insoluble silver compound from the class consisting of silver oxide and silver carbonate, and subsequently heating said article to reduce the silver compound to metallic silver and drive off undesirable reaction products.

2. A method of introducing and uniformly distributing metallic silver into a carbon article, which method comprises impregnating the carbon article with an aqueous solution of silver nitrate, soaking said carbon article in a saturated aqueous solution of ammonium carbonate while said carbon article is still wet to precipitate in situ the silver ions out of said silver nitrate solution as silver carbonate, and thereafter heating said article to reduce the silver carbonate to metallic silver.

3. A method of introducing and uniformly distributing metallic silver into a carbon article, which method comprises impregnating the carbon article with an aqueous solution of silver nitrate, precipitating the silver ions out of said silver nitrate solution as an insoluble silver oxide having a relatively low volatility and capable on thermal decomposition of yielding reaction products which are not deleterious to the composition of said carbon article, and subsequently heating said article to reduce the insoluble silver oxide to metallic silver and drive off undesirable reaction products.

4. A method of introducing and uniformly distributing metallic silver into a carbon article, which method comprises impregnating the carbon article with an aqueous solution of silver nitrate, exposing the carbon article to ammonia fumes while said carbon article is still wet to precipitate in situ the silver ions out of said silver nitrate solution as silver oxide, and thereafter heating said article to reduce the silver oxide to metallic silver, and drive off undesirable reaction products.

References Cited in the file of this patent

UNITED STATES PATENTS

| | | |
|---|---|---|
| 656,651 | Markey | Aug. 28, 1900 |
| 2,428,036 | Peters et al. | Sept. 30, 1947 |
| 2,615,932 | Marko et al. | Oct. 28, 1952 |
| 2,790,736 | McLaughlin et al. | Apr. 30, 1957 |

OTHER REFERENCES

Mellor: Comprehensive Treatise on Inorganic and Theoretical Chemistry, 1923, vol. 3, page 442. (Copy in Div. 59.)